(12) United States Patent
Liu et al.

(10) Patent No.: US 11,292,736 B2
(45) Date of Patent: Apr. 5, 2022

(54) DEVICE AND METHOD FOR INSTALLING AEROBIC THREE-PHASE SEPARATOR WITHOUT INTERRUPTION OF PRODUCTION

(71) Applicant: QINGYAN ENVIRONMENTAL TECHNOLOGY CO., LTD., Shenzhen (CN)

(72) Inventors: Shujie Liu, Guangdong (CN); Xu Liu, Guangdong (CN); Fuming Chen, Guangdong (CN)

(73) Assignee: QINGY AN ENVIRONMENTAL TECHNOLOGY CO., LTD., Shenzhen (CN)

( * ) Notice: Subject to any disclaimer, the term of this patent is extended or adjusted under 35 U.S.C. 154(b) by 81 days.

(21) Appl. No.: 16/748,780

(22) Filed: Jan. 21, 2020

(65) Prior Publication Data

US 2020/0156974 A1 May 21, 2020

Related U.S. Application Data

(63) Continuation of application No. PCT/CN2017/109533, filed on Nov. 6, 2017.

(51) Int. Cl.
*C02F 3/30* (2006.01)
*B01D 21/24* (2006.01)
(Continued)

(52) U.S. Cl.
CPC .............. *C02F 3/30* (2013.01); *B01D 21/0024* (2013.01); *B01D 21/2427* (2013.01);
(Continued)

(58) Field of Classification Search
CPC ............ B01D 21/0024; B01D 21/0027; B01D 21/0066; B01D 21/2427; B01D 21/2444;
(Continued)

(56) References Cited

U.S. PATENT DOCUMENTS

2018/0170769 A1*  6/2018  Wright ............... B01D 21/2444

FOREIGN PATENT DOCUMENTS

| CN | 102863122 A | 1/2013 |
| CN | 106145316 A | 11/2016 |
| CN | 205973953 U | 2/2017 |

OTHER PUBLICATIONS

International Search Report of PCT Patent Application No. PCT/CN2017/109533 dated Jul. 25, 2018.

* cited by examiner

*Primary Examiner* — Terry K Cecil

(57) ABSTRACT

A device and a method for installing an aerobic three-phase separator without interruption of production. The device comprises an aeration tank, the top of the aeration tank is provided with a number of aerobic three-phase separators that are capable of aeration at the bottom and are provided with a gas barrier at a sludge outlet. Each of the aerobic three-phase separators comprises an overflow trough, and the bottom of the overflow trough is provided with a drain pipe leading to the outside of the bottom end of the aerobic three-phase separator. Each of the drain pipes is connected to one end of a water outlet hose, and the other end of each water outlet hose is connected to a water outlet manifold. One end of the water outlet manifold is a sealed end, and the other end is bent downward and leads to a water level tank.

12 Claims, 4 Drawing Sheets

(51) Int. Cl.
 *B01D 21/00* (2006.01)
 *C02F 1/00* (2006.01)
 *B01D 21/30* (2006.01)
(52) U.S. Cl.
 CPC .......... *B01D 21/2444* (2013.01); *B01D 21/30* (2013.01); *C02F 2001/007* (2013.01); *C02F 2201/005* (2013.01); *C02F 2209/40* (2013.01); *C02F 2209/42* (2013.01)
(58) Field of Classification Search
 CPC ............... B01D 21/30; C02F 2001/007; C02F 2201/005; C02F 2209/40; C02F 2209/42; C02F 2303/14; C02F 3/30
 See application file for complete search history.

DEVICE AND METHOD FOR INSTALLING AEROBIC THREE-PHASE SEPARATOR WITHOUT INTERRUPTION OF PRODUCTION

CROSS REFERENCE TO RELATED APPLICATIONS

The present application is a Continuation Application of PCT Application No. PCT/CN2017/109533 filed on Nov. 6, 2017, the contents of which are incorporated herein by reference in their entirety.

FIELD OF THE INVENTION

The invention relates to the technical field of sewage treatment, and in particular to a device and method for installing aerobic three-phase separators without interruption of production which are needed in an in-situ reconstruction of an existing sewage treatment plant.

BACKGROUND OF THE INVENTION

With the urbanization process and the accelerated development of industry in China, environmental protection, especially urban sewage treatment, has become a hot topic in the world. However, as a large amount of domestic and industrial sewage flows into rivers, lakes or groundwater, the water are polluted seriously, and the fishery water, the domestic water, and the like are also been affected. Urban sewage pollution has become one of the important factors restricting the development of China, therefore the China national discharge standards for sewage treatment plants are increasingly strict. In response to the China national call of energy conservation and emission reduction, more and more urban sewage treatment plants have upgraded the discharge standards from the primary standard B in GB18918-2002 "Emission Standards for Pollutants of Urban Sewage Treatment Plants" to the primary standard A or a higher standard. For higher discharge standards, conventional treatment units in many water plants have been unable to meet existing requirements due to design reasons. Therefore, the upgrading of sewage treatment plants has to be put on the agenda. When reconstructing an existing sewage treatment plant, it is generally not allowed to stop production. The previous aeration tank is full of sewage, however, it needs to meet the requirements of normal aeration and normal sewage treatment. Therefore, a sewage treatment device that can meet the requirements of non-stop production and reconstruction is needed. An aerobic three-phase separator is installed in an existing aeration tank to build a reaction-sediment integrated circulation bioreactor, which can achieve the effect of in-situ upgrading. However, in the case where the aeration tank is not empty, the water outlet pipe of the three-phase aerobic separator cannot be installed by conventional methods.

SUMMARY OF THE INVENTION

Technical Problem to be Solved

An objective of the present invention is to provide a device and a method capable of installing aerobic three-phase separators without interruption of production.

Solution to the Technical Problem to be Solved

Solution

To achieve the above objective, the following technical solutions are adopted in the present invention:

A device for installing an aerobic three-phase separator without interruption of production is provided, comprising an aeration tank, wherein the aeration tank is capable of aeration at its bottom and a top of the aeration tank is provided with a plurality of aerobic three-phase separators that are each provided with an air blocking member at a sludge outlet; each of the aerobic three-phase separators comprises an overflow weir trough, and a bottom of the overflow weir trough is provided with a drainage pipe leading to the outside of a bottom end of an aerobic three-phase separator; each of the drainage pipes is connected to one end of a water outlet hose, and the other end of the water outlet hose is connected to a water outlet manifold; one end of the water outlet manifold is a sealed end, and the other end of the water outlet manifold is bent downward and leads to a water level pool; an upper part of the water level pool is provided with an overflow port or an overflow pipe, and a minimum overflow height of the overflow port or the overflow pipe is lower than a top of the overflow weir trough; and an evacuation system for creating siphon conditions is provided in the water outlet manifold.

Preferably, the evacuation system comprises an air observation cylinder, an air extracting pump, an exhaust pipe, a check valve, and an automatic control device; the exhaust pipe and the check valve are provided in the water outlet manifold and are close to the sealed end of the water outlet manifold; the exhaust pipe and the check valve are connected to the air extracting pump through a pipeline; the air extracting pump is connected with the water outlet manifold through the air observation cylinder, and a float level switch is provided in the air observation cylinder to control opening and closing of the air extracting pump.

Preferably, an installation framework for placing the three-phase aerobic separators is positioned at the top of walls of the aeration tank.

Preferably, the minimum overflow height of the overflow port is lower than the water level height of the sedimentation zone in the aerobic three-phase separator by 0.5 m or more.

Preferably, an effective volume of the water level pool is greater than twice a volume of the water outlet manifold.

Preferably, a port of the other end of the water outlet manifold which is bent downward and leads to the water level pool is lower than the minimum overflow height of the overflow port by 1 m or more, and is higher than the bottom of the water level pool by 0.2 m or more.

A method of installing an aerobic three-phase separator without interruption of production is also provided in the present application, which comprises the following steps:

Step 1. Dispose a water level pool with an overflow port at one side of a water outlet of an aeration tank;

Step 2. Install a water outlet manifold over the top of the aeration tank, wherein one end of the water outlet manifold is a sealed end and the other end of the water outlet manifold is bent downward and leads to a water level pool, a port of the other end of the water outlet manifold which is bent downward and leads to the water level pool is lower than a minimum overflow height of the overflow port by 1 m or more, and is higher than the bottom of the water level pool by 0.2 m or more;

Step 3. Dispose an evacuation system on the water outlet manifold;

Step 4. Assemble a plurality of aerobic three-phase separators outside the aeration tank, and connect each of aerobic three-phase separators to one end of an outlet hose;

Step 5. Hoisting the plurality of aerobic three-phase separators to the top of the aeration tank, and connect the other end of the outlet hose to the water outlet manifold;

Step 6. Fill the water level pool with clear water;

Step 7. Adjust horizontal heights of the three-phase aerobic separators so that each of the aerobic three-phase separators is in an overflow state, then start the evacuation system to create siphon conditions for the water outlet manifold; and Step 8. Close the evacuation system after the aerobic three-phase separators have discharged water normally.

Technical Effects of the Present Application

Technical Effects

The aerobic three-phase separators in the present invention are suspended in the aeration tank, the aeration tank is aerated upward, and the sludge outlet of each of the aerobic three-phase separators is provided with an air blocking member to prevent aerated gas from entering the aerobic three-phase separators, thereby achieving external aerobic sewage treatment and internal anaerobic sewage treatment of the aerobic three-phase separators.

If sewage cannot be discharged in the reconstruction of the aeration tank, siphon conditions could be created by the evacuation system, and the sewage flows together from the outlet hoses in the aerobic three-phase separators provided at the top of the aeration tank to the water outlet manifold and finally flows to the water level pool for discharge, which simultaneously meets the requirements of sewage treatment in non-stop production and reconstruction.

The air observation cylinder provided in the present invention is convenient for the staff to observe water level changes and judge air leakage of the pipeline during debugging.

The installation framework in the present invention can be manufactured according to the actual size of the aeration tank, which can meet the requirements of the aeration tank in non-stop production and reconstruction in different places, and has a wide application range.

DETAILED DESCRIPTION OF PREFERRED EMBODIMENTS

Best Embodiment of the Present Invention

The present invention is further described in detail below with reference to drawings and specific embodiments.

Figure 1:
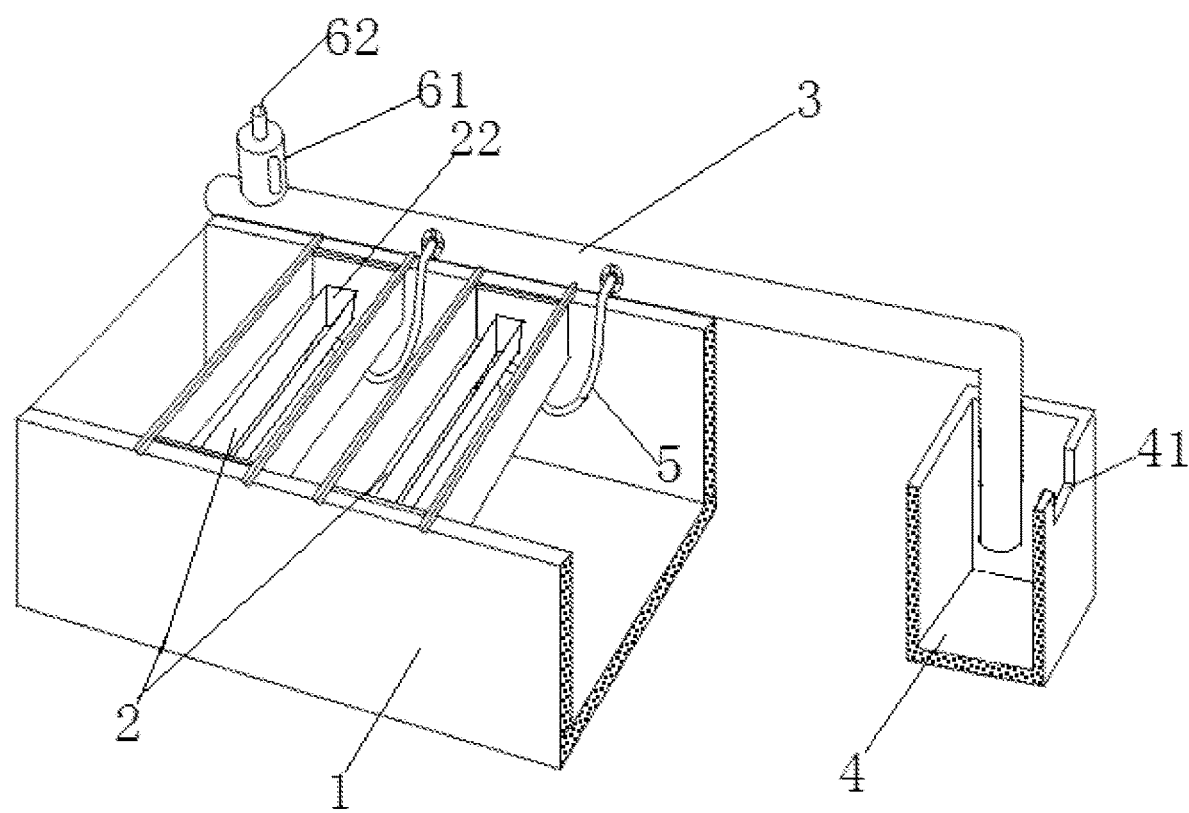
FIG. 1 is a schematic overall structure diagram of a device for installing aerobic three-phase separators without interruption of production according to the present invention.

Refer to FIG. 1. A device for installing aerobic three-phase separators without interruption of production according to the embodiment comprises an aeration tank 1, wherein the aeration tank is capable of aeration at its bottom and a top of the aeration tank 1 is provided with a plurality of aerobic three-phase separators 2 that are each provided with an air blocking member at a sludge outlet; each of the aerobic three-phase separators 2 comprises an overflow weir trough 22, and a bottom of the overflow weir trough 22 is provided with a drainage pipe leading to the outside of a bottom end of an aerobic three-phase separator; each of the drainage pipes is connected to one end of a water outlet hose 5, and the other end of the water outlet hose 5 is connected to a water outlet manifold 3; one end of the water outlet manifold 3 is a sealed end, and the other end of the water outlet manifold 3 is bent downward and leads to a water level tool 4; a side surface of an upper part of the water level pool 4 is provided with an overflow port 41, and a minimum overflow height of the overflow port 41 is lower than a top of the overflow weir trough 22; an exhaust pipe and a check valve are provided in the water outlet manifold 3 and are close to the sealed end of the water outlet manifold 3; the exhaust pipe and the check valve are connected to an air extracting pump 62 through a pipeline; the air extracting pump 62 is connected with the water outlet manifold 3 through an air observation cylinder 61; a float level switch is provided in the air observation cylinder 61 to control opening and closing of the air extracting pump 62; and an effective volume of the water level pool 4 is greater than twice a volume of the water outlet manifold 3.

Figure 2:
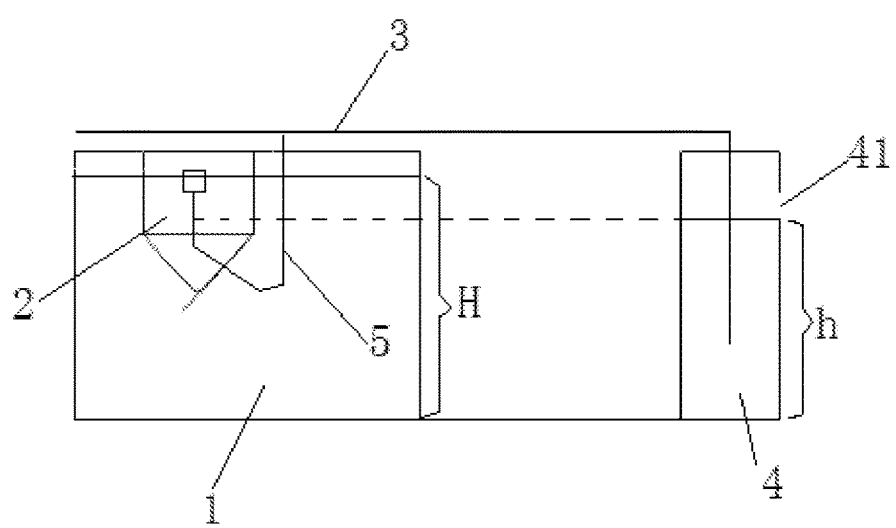
FIG. 2 is a diagram schematically showing a water level of a device for installing aerobic three-phase separators without interruption of production according to the present invention.

Refer to FIG. 2. In the embodiment, the minimum overflow height h of the overflow port 41 is lower than the water level height H of the sedimentation zone in the aerobic three-phase separator 2 by 0.5 to 0.8 m; the port of the other end of the water outlet manifold 3 which is bent downward and leads to the water level pool 4 is lower than the minimum overflow height h of the overflow port 41 by 1 m or more, and is higher than the bottom of the water level pool 4 by 0.5 m or more.

Figure 3:
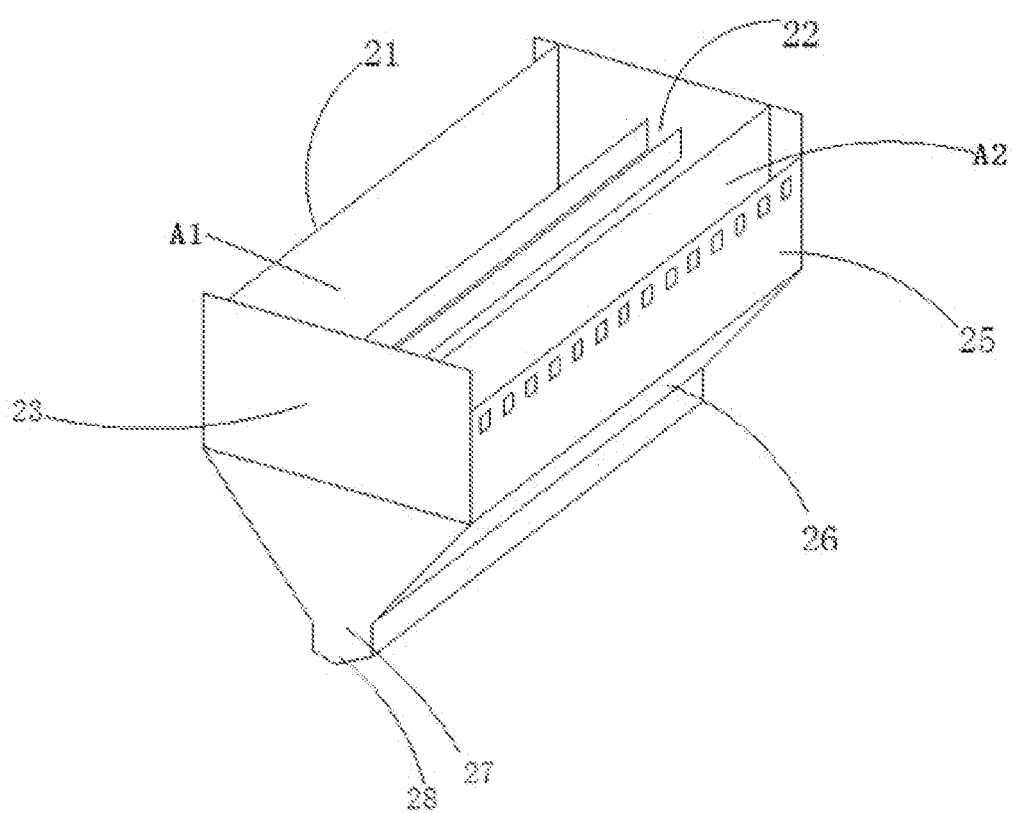
FIG. 3 is a schematic overall structure diagram of an aerobic three-phase separator according to the present invention.
Figure 4:
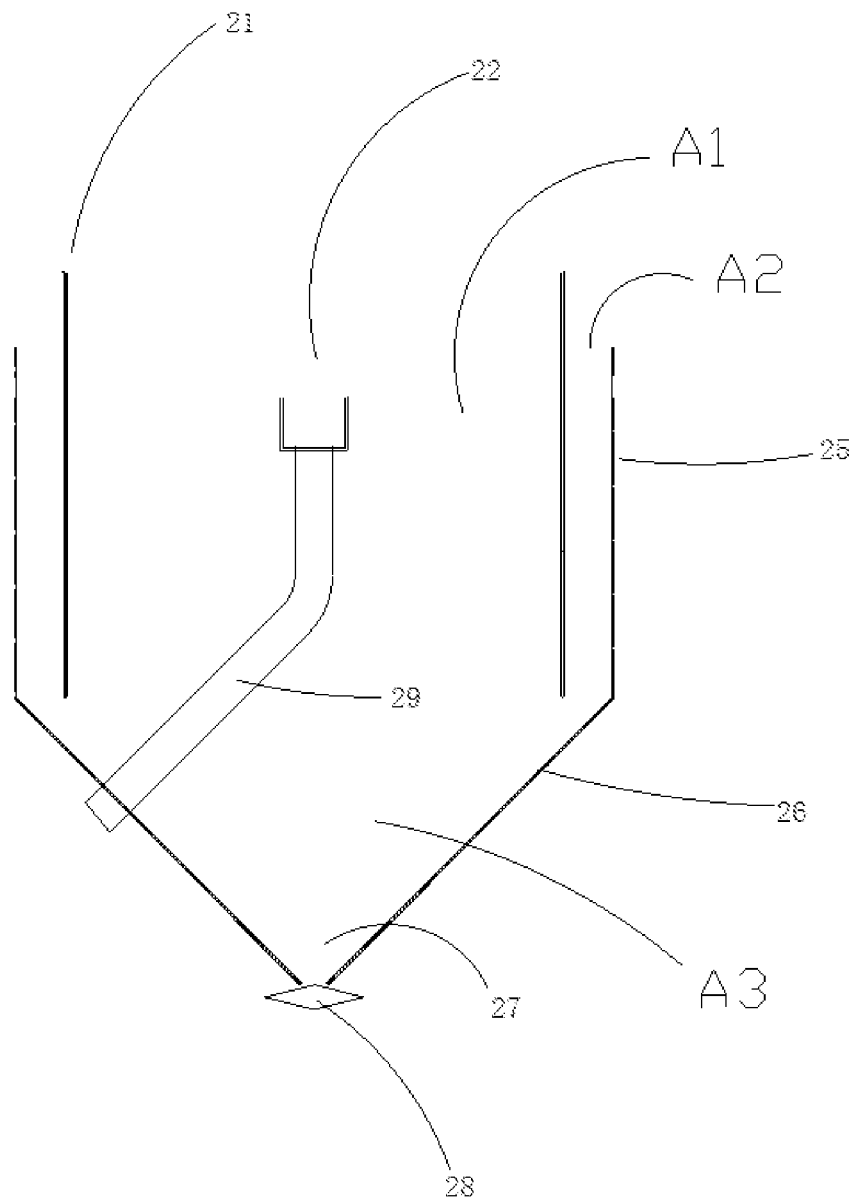
FIG. 4 is a schematic cross-sectional structure diagram of the aerobic three-phase separator in FIG. 3.

Refer to FIGS. 3 and 4. The aerobic three-phase separator 2 in this embodiment comprises: two end plates 23 which are arranged in parallel and are each integrally formed by a lower inverted trapezoid plate and an upper rectangular plate; two guide plates 25 which are respectively vertically connected with edges of the two end plates 23 and form a rectangular cavity at the top; two inclined plates 26 with a sludge outlet 27 and a conical cavity at the bottom, which are formed by folding inward lower ends of the two guide plates 25 and vertically connecting to edges of the lower inverted trapezoid plates of the end plates 23; an overflow wire trough 22 provided between the two end plates 23 in an direction of the horizontal axis of the rectangular cavity at the top; a drainage pipe 29 provided between the bottom of the overflow weir trough 22 and the inclined plate 26; two sedimentation partition plates 21, symmetrically provided between the overflow weir trough 22 and the two guide plates 25 at the sides of the overflow weir trough 22 and respectively suspended downward from the top of the two end plates 23; a sludge sedimentation area A1, formed between the sedimentation partition plates 21; a guide area A2 formed between the sedimentation partition plates 21 and the two guide plates 25; a conical sludge bucket area A3 formed by two inclined plates 26 which are formed by folding inward lower ends of the two guide plates 25; and an air blocking member 28 provided at the sludge outlet.

Figure 5:
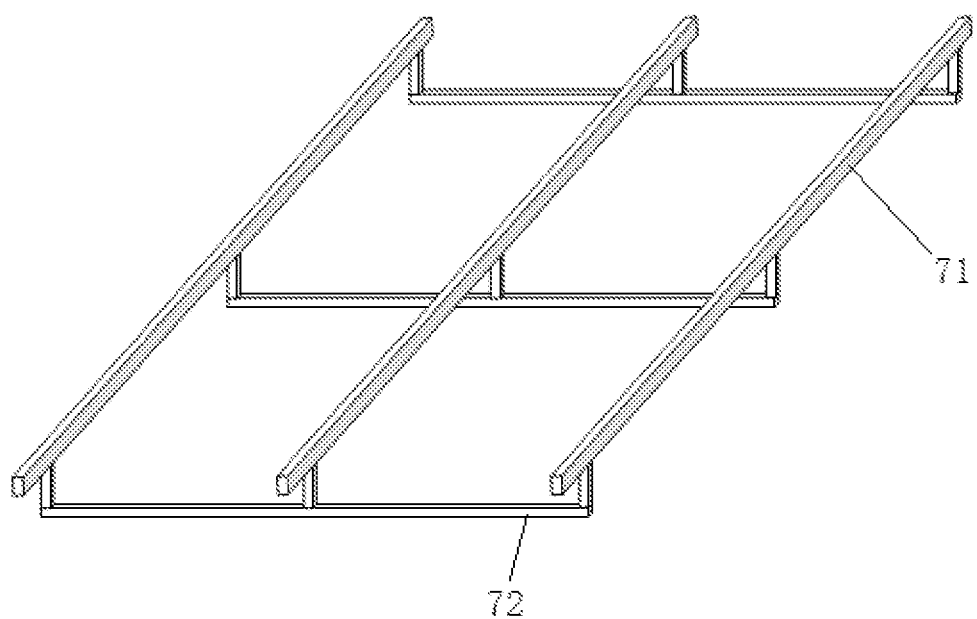
FIG. 5 is a schematic structure diagram of an installation framework according to present invention.

Refer to FIG. 5. When the size of the aeration tank 1 is not sufficient to directly suspend the aerobic three-phase separators 2, an installation framework shown in FIG. 5 can be manufactured according to the structural size of the aeration tank 1. The aerobic three-phase separators 2 are installed on the installation framework, then they are suspended to the top of the aeration tank 1 together with the installation framework. The installation framework comprises a plurality of transversal beams 71 and longitudinal beams 72 which are interconnected each other, the plurality of transversal beams 71 and longitudinal beams 72 are equally spaced and adapted to the size of the aerobic three-phase separators 2.

The installation method for this embodiment is as follows:

Step 1. Dispose a water level pool 4 with an overflow port 41 at one side of an water outlet of an aeration tank 1;

Step 2. Install a water outlet manifold 3 over the top of the aeration tank 1, one end of the water outlet manifold 3 is a sealed end and the other end of the water outlet manifold 3 is bent downward and leads to a water level pool 4, a port of the other end of the water outlet manifold 3 which is bent downward and leads to the water level pool 4 is lower than a minimum overflow height of the overflow port 41 by 1 m or more, and is higher than the bottom of the water level pool 4 by 0.5 m or more;

Step 3. Dispose an evacuation system on the water outlet manifold 3; the evacuation system comprises an air observation cylinder 61, an air extracting pump 62, an exhaust pipe, a check valve, and an automatic control device; the exhaust pipe and the check valve are arranged in the water outlet manifold 3 and are close to the sealed end of the water outlet manifold 3; the exhaust pipe and the check valve are connected to the air extracting pump 62 through a pipeline; the air extracting pump 62 is connected with the water outlet manifold 3 through the air observation cylinder 61, and a float level switch is provided in the air observation cylinder 61 to control opening and closing of the air extracting pump 62;

Step 4. Assemble a plurality of aerobic three-phase separators 2 outside the aeration tank 1, and connecting each of aerobic three-phase separators 2 to one end of an outlet hose 5;

Step 5. Suspend the plurality of aerobic three-phase separators 2 to the top of the aeration tank 1, and connecting the other end of the outlet hose 5 to the water outlet manifold 3;

Step 6. Fill the water level pool 4 with clear water;

Step 7. Turn on the power supply of the evacuation system when each of the aerobic three-phase separators 2 is in an overflow state, then the evacuation system creates siphon conditions; since there is no water in the outlet manifold 3, the air exacting pump 62 will automatically turn on to exhaust air until the observation cylinder 61 is filled with water; when the air extracting pump 62 automatically stops, the water level pool 4 discharges water;

Step 8. Carefully observe water level changes in air observation cylinder 61; if the water level drops too quickly, there would be air leakage in the pipeline; if so, find out the air leakage and plug it.

After the above steps are completed, the sewage treatment device can start normal operation.

INDUSTRIAL APPLICABILITY

The above description is only a preferred embodiment of the present invention, and the above specific embodiments are not a limitation on the present invention. Within the scope of the technical concept of the present invention, various changes and modifications can occur. Any modification, changes, or equivalent replacement made by those skilled in the art according to the above description should all fall within the protection scope of the present invention.

What is claimed is:

1. A device for installing an aerobic three-phase separator without interruption of production, comprising an aeration tank, wherein the aeration tank is capable of aeration at its bottom and a top of the aeration tank is provided with a plurality of aerobic three-phase separators that are each provided at a bottom thereof with an air blocking member at a sludge outlet; each of the aerobic three-phase separators comprises an overflow weir trough, and a bottom of the overflow weir trough is provided with a drainage pipe leading to the outside of a bottom end of the respective aerobic three-phase separator; each of the drainage pipes is connected to one end of a water outlet hose, and the other end of the water outlet hose is connected to a water outlet manifold; one end of the water outlet manifold is a sealed end, and the other end of the water outlet manifold is bent downward and leads to a water level pool; an upper part of the water level pool is provided with an overflow port or an overflow pipe, and a minimum overflow height of the overflow port or the overflow pipe is lower than a top of the overflow weir troughs; and an evacuation system for creating siphon conditions is provided in the water outlet manifold.

2. The device for installing an aerobic three-phase separator without interruption of production according to claim 1, wherein the evacuation system comprises an air observation cylinder, an air extracting pump, an exhaust pipe, a check valve, and an automatic control device; the exhaust pipe and the check valve are provided in the water outlet manifold and are close to the sealed end of the water outlet manifold; the exhaust pipe and the check valve are connected to the air extracting pump through a pipeline; the air extracting pump is connected with the water outlet manifold through the air observation cylinder, and a float level switch is provided in the air observation cylinder to control opening and closing of the air extracting pump.

3. A method of installing an aerobic three-phase separator without interruption of production in the device according to claim 2, wherein the method comprises the following steps:

Step 1. Dispose the water level pool with the overflow port at one side of a water outlet of the aeration tank;

Step 2. Install the water outlet manifold over the top of the aeration tank, one end of the water outlet manifold is a sealed end and the other end of the water outlet manifold is bent downward and leads to the water level pool, a port of the other end of the water outlet manifold which is bent downward and leads to the water level pool is lower than a minimum overflow height of the overflow port by 1 m or more, and is higher than a bottom of the water level pool by 0.2 m or more;

Step 3. Dispose the evacuation system on the water outlet manifold;

Step 4. Assemble the plurality of aerobic three-phase separators outside the aeration tank, and connect each of aerobic three-phase separators to one end of the outlet hose;

Step 5. Suspend the plurality of aerobic three-phase separators to the top of the aeration tank, and connect the other end of the outlet hose to the water outlet manifold;

Step 6. Fill the water level pool with clear water;

Step 7. Adjust horizontal heights of the three-phase aerobic separators so that each of the aerobic three-phase separators is in an overflow state, then start the evacuation system to create siphon conditions for the water outlet manifold; and Step 8. Close the evacuation system after the aerobic three-phase separators have discharged water normally.

4. The device for installing an aerobic three-phase separator without interruption of production according to claim 1, wherein an installation framework for placing the three-phase aerobic separators is positioned at the top of walls of the aeration tank.

5. A method of installing an aerobic three-phase separator without interruption of production in the device according to claim 4, wherein the method comprises the following steps:
Step 1. Dispose the water level pool with the overflow port at one side of a water outlet of the aeration tank;
Step 2. Install the water outlet manifold over the top of the aeration tank, one end of the water outlet manifold is a sealed end and the other end of the water outlet manifold is bent downward and leads to the water level pool, a port of the other end of the water outlet manifold which is bent downward and leads to the water level pool is lower than a minimum overflow height of the overflow port by 1 m or more, and is higher than a bottom of the water level pool by 0.2 m or more;
Step 3. Dispose the evacuation system on the water outlet manifold;
Step 4. Assemble the plurality of aerobic three-phase separators outside the aeration tank, and connect each of aerobic three-phase separators to one end of the outlet hose;
Step 5. Suspend the plurality of aerobic three-phase separators to the top of the aeration tank, and connect the other end of the outlet hose to the water outlet manifold;
Step 6. Fill the water level pool with clear water;
Step 7. Adjust horizontal heights of the three-phase aerobic separators so that each of the aerobic three-phase separators is in an overflow state, then start the evacuation system to create siphon conditions for the water outlet manifold; and
Step 8. Close the evacuation system after the aerobic three-phase separators have discharged water normally.

6. The device for installing an aerobic three-phase separator without interruption of production according to claim 1, wherein the minimum overflow height of the overflow port is lower than the top of the overflow weir trough by 0.5 m or more.

7. A method of installing an aerobic three-phase separator without interruption of production according to claim 6, wherein the method comprises the following Steps:
Step 1. Dispose the water level pool with the overflow port at one side of a water outlet of the aeration tank;
Step 2. Install the water outlet manifold over the top of the aeration tank, one end of the water outlet manifold is a sealed end and the other end of the water outlet manifold is bent downward and leads to the water level pool, a port of the other end of the water outlet manifold which is bent downward and leads to the water level pool is lower than a minimum overflow height of the overflow port by 1 m or more, and is higher than a bottom of the water level pool by 0.2 m or more;
Step 3. Dispose the evacuation system on the water outlet manifold;
Step 4. Assemble the plurality of aerobic three-phase separators outside the aeration tank, and connect each of aerobic three-phase separators to one end of the outlet hose;
Step 5. Suspend the plurality of aerobic three-phase separators to the top of the aeration tank, and connect the other end of the outlet hose to the water outlet manifold;
Step 6. Fill the water level pool with clear water;
Step 7. Adjust horizontal heights of the three-phase aerobic separators so that each of the aerobic three-phase separators is in an overflow state, then start the evacuation system to create siphon conditions for the water outlet manifold; and
Step 8. Close the evacuation system after the aerobic three-phase separators have discharged water normally.

8. The device for installing an aerobic three-phase separator without interruption of production according to claim 1, wherein an effective volume of the water level pool is greater than twice a volume of the water outlet manifold.

9. A method of installing an aerobic three-phase separator without interruption of production according to claim 8, wherein the method comprises the following steps:
Step 1. Dispose the water level pool with the overflow port at one side of a water outlet of the aeration tank;
Step 2. Install the water outlet manifold over the top of the aeration tank, one end of the water outlet manifold is a sealed end and the other end of the water outlet manifold is bent downward and leads to the water level pool, a port of the other end of the water outlet manifold which is bent downward and leads to the water level pool is lower than a minimum overflow height of the overflow port by 1 m or more, and is higher than a bottom of the water level pool by 0.2 m or more;
Step 3. Dispose the evacuation system on the water outlet manifold;
Step 4. Assemble the plurality of aerobic three-phase separators outside the aeration tank, and connect each of aerobic three-phase separators to one end of the outlet hose;
Step 5. Suspend the plurality of aerobic three-phase separators to the top of the aeration tank, and connect the other end of the outlet hose to the water outlet manifold;
Step 6. Fill the water level pool with clear water;
Step 7. Adjust horizontal heights of the three-phase aerobic separators so that each of the aerobic three-phase separators is in an overflow state, then start the evacuation system to create siphon conditions for the water outlet manifold; and
Step 8. Close the evacuation system after the aerobic three-phase separators have discharged water normally.

10. The device for installing an aerobic three-phase separator without interruption of production according to claim 1, wherein a port of the other end of the water outlet manifold which is bent downward and leads to the water level pool is lower than the minimum overflow height of the overflow port by 1 m or more, and is higher than a bottom of the water level pool by 0.2 m or more.

11. A method of installing an aerobic three-phase separator without interruption of production according to claim 10, wherein the method comprises the following steps:
Step 1. Dispose the water level pool with the overflow port at one side of the water outlet of the aeration tank;
Step 2. Install the water outlet manifold over the top of the aeration tank, one end of the water outlet manifold is a sealed end and the other end of the water outlet manifold is bent downward and leads to the water level pool, the port of the other end of the water outlet manifold which is bent downward and leads to the water level pool is lower than the minimum overflow height of the overflow port by 1 m or more, and is higher than the bottom of the water level pool by 0.2 m or more;

Step 3. Dispose the evacuation system on the water outlet manifold;

Step 4. Assemble the plurality of aerobic three-phase separators outside the aeration tank, and connect each of aerobic three-phase separators to one end of the outlet hose;

Step 5. Suspend the plurality of aerobic three-phase separators to the top of the aeration tank, and connect the other end of the outlet hose to the water outlet manifold;

Step 6. Fill the water level pool with clear water;

Step 7. Adjust horizontal heights of the three-phase aerobic separators so that each of the aerobic three-phase separators is in an overflow state, then start the evacuation system to create siphon conditions for the water outlet manifold; and Step 8. Close the evacuation system after the aerobic three-phase separators have discharged water normally.

12. A method of installing an aerobic three-phase separator without interruption of production in the device according to claim 1, wherein the method comprises the following steps:

Step 1. Dispose the water level pool with the overflow port at one side of a water outlet of the aeration tank;

Step 2. Install the water outlet manifold over the top of the aeration tank, one end of the water outlet manifold is a sealed end and the other end of the water outlet manifold is bent downward and leads to the water level pool, a port of the other end of the water outlet manifold which is bent downward and leads to the water level pool is lower than a minimum overflow height of the overflow port by 1 m or more, and is higher than a bottom of the water level pool by 0.2 m or more;

Step 3. Dispose the evacuation system on the water outlet manifold;

Step 4. Assemble the plurality of aerobic three-phase separators outside the aeration tank, and connect each of aerobic three-phase separators to one end of the outlet hose;

Step 5. Suspend the plurality of aerobic three-phase separators to the top of the aeration tank, and connect the other end of the outlet hose to the water outlet manifold;

Step 6. Fill the water level pool with clear water;

Step 7. Adjust horizontal heights of the three-phase aerobic separators so that each of the aerobic three-phase separators is in an overflow state, then start the evacuation system to create siphon conditions for the water outlet manifold; and Step 8. Close the evacuation system after the aerobic three-phase separators have discharged water normally.

* * * * *